(12) United States Patent
Xu et al.

(10) Patent No.: US 12,440,809 B1
(45) Date of Patent: Oct. 14, 2025

(54) PREPARATION METHOD FOR REVERSE OSMOSIS MEMBRANE RESISTANT TO HIGH-TEMPERATURE WATER ENVIRONMENT

(71) Applicant: Zhejiang Jinmo Environmental Technology Co., Ltd, Zhejiang (CN)

(72) Inventors: Yinong Xu, Zhejiang (CN); Donggen Chen, Zhejiang (CN); Peng Liu, Zhejiang (CN); Zedong Li, Zhejiang (CN); Kan Zhang, Zhejiang (CN); Zhonghua Li, Zhejiang (CN); Qicheng Ren, Zhejiang (CN); Rui Liu, Zhejiang (CN)

(73) Assignee: Zhejiang Jinmo Environmental Technology Co., Ltd, Zhejiang (CN)

( * ) Notice: Subject to any disclaimer, the term of this patent is extended or adjusted under 35 U.S.C. 154(b) by 0 days.

(21) Appl. No.: 19/183,913

(22) Filed: Apr. 20, 2025

(51) Int. Cl.
| | |
|---|---|
| *B01D 69/12* | (2006.01) |
| *B01D 67/00* | (2006.01) |
| *B01D 69/02* | (2006.01) |
| *B01D 71/48* | (2006.01) |
| *B01D 71/56* | (2006.01) |

(52) U.S. Cl.
CPC ..... *B01D 69/1251* (2022.08); *B01D 67/0095* (2013.01); *B01D 67/0097* (2013.01); *B01D 69/02* (2013.01); *B01D 71/48* (2013.01); *B01D 71/56* (2013.01)

(58) Field of Classification Search
CPC ............... B01D 69/1251; B01D 71/56
See application file for complete search history.

(56) References Cited

U.S. PATENT DOCUMENTS

| | | | |
|---|---|---|---|
| 2016/0220968 A1* | 8/2016 | Kwon | ............... B01D 69/1216 |
| 2017/0014779 A1* | 1/2017 | Jeon | .................... B01D 71/601 |
| 2018/0271792 A1* | 9/2018 | Mantripragada | ...... A61K 47/60 |

* cited by examiner

*Primary Examiner* — Ryan B Huang
(74) *Attorney, Agent, or Firm* — JCIPRNET

(57) ABSTRACT

The invention provides a preparation method for a reverse osmosis membrane resistant to a high-temperature water environment, comprising: synthesizing an α-cyclodextrin@polyethylene glycol supramolecular inclusion complex by a saturated aqueous solution coprecipitation method; preparing an aqueous phase solution containing m-phenylenediamine, D(+) camphorsulfonic acid and triethylamine; preparing an oil phase solution containing trimesoyl chloride; preparing a secondary aqueous solution containing α-cyclodextrin@polyethylene glycol powder and triethylamine; forming an ultrathin polyamide separation layer on a base membrane by interfacial polymerization; and performing secondary interfacial polymerization to form an α-CD@PEG polyester protection layer, and storing a prepared reverse osmosis membrane in ultrapure water.

8 Claims, 1 Drawing Sheet

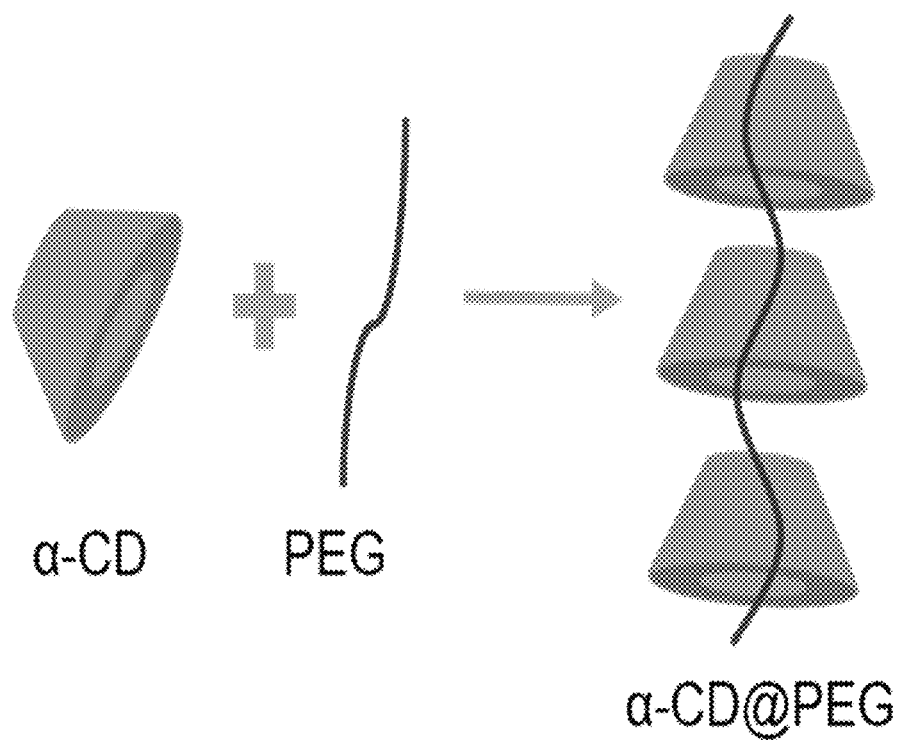

PREPARATION METHOD FOR REVERSE OSMOSIS MEMBRANE RESISTANT TO HIGH-TEMPERATURE WATER ENVIRONMENT

CROSS-REFERENCE TO RELATED APPLICATION

This application claims the priority benefit of China application serial no. 202411329481.0, filed on Sep. 24, 2024, now allowed. The entirety of the above-mentioned patent application is hereby incorporated by reference herein and made a part of this specification.

BACKGROUND OF THE INVENTION

Technical Field

The invention relates to the field of preparation of reverse osmosis membranes, in particular to a preparation method for a reverse osmosis membrane resistant to a high-temperature water environment.

Description of Related Art

Reverse osmosis membranes have been widely applied to seawater desalinization, wastewater treatment, food and pharmaceutic refinement, drinking water purification and other fields because of their features of efficient separation, small occupied area, low energy consumption, high applicability and low cost. At present, commercial reverse osmosis membranes are mainly aramid composite membranes and formed by a non-woven fabric, a porous support layer and an ultrathin separation layer at the top.

Existing commercial reverse osmosis membranes have the major defects of poor high-temperature resistance and a maximum operating temperature below 45° C. At a high temperature, the polymer net structure will expand and lead to an increase in the pore size of membranes, the internal free volume will increase, and the separation layer will be pulled due to a structural change of the support layer, such that the desalination performance of the reverse osmosis membranes will be reduced eventually, which limits the application of the reverse osmosis membranes in high-temperature water treatment. A large quantity of high-temperature wastewater will be produced in many industries such as the food industry, the textile industry, the paper-making industry and the petrochemical industry. When the high-temperature wastewater is treated, the temperature of process water needs to be decreased before the membrane separation process and is then heated to the original temperature, which not only increases operating costs and energy consumption, but also leads to the emission of more greenhouse gases.

BRIEF SUMMARY OF THE INVENTION

The invention aims to provide a preparation method for a reverse osmosis membrane resistant to a high-temperature water environment to fulfill the purpose of effectively treating high-temperature wastewater by reverse osmosis membranes. The specific scheme is as follows:

A preparation method for a reverse osmosis membrane resistant to a high-temperature water environment comprises the following steps:
(1) synthesis of an α-cyclodextrin@polyethylene glycol supramolecular inclusion complex (α-CD@PEG) by a saturated aqueous solution coprecipitation method: first, dissolving a specific quantity of polyethylene glycol in ultrapure water to prepare a polyethylene glycol saturated aqueous solution; then, adding α-cyclodextrin powder to the polyethylene glycol saturated aqueous solution, performing constant-temperature stirring and standing, cooling to an ambient temperature, filtering out precipitates, and drying to obtain α-cyclodextrin@polyethylene glycol powder;
(2) preparation of an aqueous phase solution: dissolving a specific quantity of m-phenylenediamine, D(+) camphorsulfonic acid and triethylamine in a specific quantity of ultrapure water to prepare the aqueous phase solution;
(3) preparation of an oil phase solution: dissolving a specific quantity of trimesoyl chloride in a specific quantity of n-hexane to prepare the oil phase solution;
(4) preparation of a secondary aqueous phase solution: dissolving a specific quantity of the α-cyclodextrin@polyethylene glycol powder and triethylamine in a specific quantity of ultrapure water to prepare the secondary aqueous phase solution;
(5) interfacial polymerization: taking a base membrane from water, blowing water away from the surface of the base membrane with nitrogen, and pouring the aqueous phase solution onto the surface of the base membrane for 30 s-180 s; removing the superfluous aqueous phase solution, and then blow-drying the surface of the base membrane with nitrogen; pouring the oil phase solution onto the surface of the base membrane for a reaction, and then removing the superfluous oil phase solution; thermocuring a prepared membrane in an oven to form an ultrathin polyamide separation layer; and
(6) secondary interfacial polymerization: pouring the secondary aqueous phase solution onto the surface of the membrane for a reaction, and then removing the superfluous solution to form an α-CD@PEG polyester protection layer; washing the surface of a prepared reverse osmosis membrane with ultrapure water, and then storing the reverse osmosis membrane in ultrapure water.

In Step (1), the molar ratio of α-cyclodextrin to polyethylene glycol is one of 4:1, 5:1, 6:1, 7:1 and 8:1.

In Step (1), the constant-temperature stirring is performed at 65° C. for 1 h, and then the solution stands for 12 hrs.

In Step (1), the drying is performed at 70° C. for 12 hrs.

In Step (2), the concentration of the phenylenediamine is 2-2.5 wt %, the concentration of the D(+) camphorsulfonic acid is 1.2-2.4 wt %, and the concentration of the triethylamine is 1.3 wt %; in Step (3), the concentration of the trimesoyl chloride is 0.1 wt %.

In Step (5), the aqueous phase solution retains on the surface of the base membrane for 120-180 s.

In Step (5), the prepared membrane is thermocured in the oven at a temperature of 80° C. for 5 min.

In Step (6), the reverse osmosis membrane is stored in ultrapure water at a temperature of 4° C.

α-cyclodextrin used in the invention is a cyclic oligosaccharide, which has a hydrophilic outer side and a hydrophobic pocket and includes six glucose units, such a special structure makes the α-cyclodextrin become a natural complexing agent, and other molecules can be wrapped in the hydrophobic pocket of the α-cyclodextrin, such that the solubility and stability of these molecules are improved; the driving power for forming the inclusion complex is from high-energy water molecules released from the pocket of the α-cyclodextrin, electrostatic interaction, van der Waals interaction, hydrophobic interaction, hydrogen bonds, and the like. Polyethylene glycol is included in the α-cyclodextrin, such that the thermal stability of the polyethylene glycol and the α-cyclodextrin is improved. Moreover, the α-cyclodextrin contains abundant hydroxy, the polyethylene glycol is alcohol containing hydroxy, and the α-cyclodextrin and the polyethylene glycol react with residual acyl chloride on the surface of a polyamide membrane to form a polyester protection layer on the surface of the membrane.

BRIEF DESCRIPTION OF THE SEVERAL VIEWS OF THE DRAWINGS

FIG. 1s a schematic diagram of α-cyclodextrin (α-CD) including polyethylene glycol (PEG).

DETAILED DESCRIPTION OF THE INVENTION

1. Preparation method for a reverse osmosis membrane resistant to a high-temperature water environment.

The preparation method specifically comprises the following steps:
  (1) synthesis of an α-cyclodextrin@polyethylene glycol supramolecular inclusion complex (α-CD@PEG) by a saturated aqueous solution coprecipitation method: first, dissolving a specific quantity of polyethylene glycol (PEG) in ultrapure water to prepare a PEG saturated aqueous solution (50 g/L); then, adding α-CD powder to the PEG saturated aqueous solution, wherein the molar ratio of α-CD to PEG is 4:1, 5:1, 6:1, 7:1 or 8:1; performing constant-temperature stirring at 65° C. for 1 h, allowing the solution to stand for 12 hrs, cooling to an ambient temperature, filtering out precipitates, and drying at 70° C. for 12 hrs to obtain α-CD@PEG powder;
  (2) preparation of an aqueous phase solution: dissolving a specific quantity of m-phenylenediamine, D(+) camphorsulfonic acid and triethylamine in a specific quantity of ultrapure water to prepare the aqueous phase solution;
  (3) preparation of an oil phase solution: dissolving a specific quantity of trimesoyl chloride in a specific quantity of n-hexane to prepare the oil phase solution;
  (4) preparation of a secondary aqueous phase solution: dissolving a specific quantity of the α-CD@PEG powder and triethylamine in a specific quantity of ultrapure water to prepare the secondary aqueous phase solution;
  (5) interfacial polymerization: taking a base membrane from water, blowing water away from the surface of the base membrane with nitrogen, and pouring the aqueous phase solution onto the surface of the base membrane for 30 s-180 s; removing the superfluous aqueous phase solution, and then blow-drying the surface of the base membrane with nitrogen; pouring the oil phase solution onto the surface of the base membrane for a reaction for 60 s, and then removing the superfluous oil phase solution; thermocuring a prepared membrane in an oven at a temperature of 80° C. for 5 min to form an ultrathin polyamide (PA) separation layer; and
  (6) secondary interfacial polymerization: pouring the secondary aqueous phase solution onto the surface of the membrane for a reaction for 3 min, and then removing the superfluous solution to form an α-CD@PEG polyester protection layer; washing the surface of a prepared reverse osmosis membrane with ultrapure water 2-3 times, and then storing the reverse osmosis membrane in ultrapure water at a temperature of 4° C.

α-cyclodextrin used in Step (1) is a cyclic oligosaccharide, which has a hydrophilic outer side and a hydrophobic pocket and includes six glucose units, such a special structure makes the α-cyclodextrin become a natural complexing agent, and other molecules can be wrapped in the hydrophobic pocket of the α-cyclodextrin, such that the solubility and stability of these molecules are improved; the driving power for forming the inclusion complex is from high-energy water molecules released from the pocket of the α-cyclodextrin, electrostatic interaction, van der Waals interaction, hydrophobic interaction, hydrogen bonds, and the like. Polyethylene glycol is included in the α-cyclodextrin, such that the thermal stability of the polyethylene glycol and the α-cyclodextrin is improved. Moreover, the α-cyclodextrin contains abundant hydroxy, the polyethylene glycol is alcohol containing hydroxy, and the α-cyclodextrin and the polyethylene glycol react with residual acyl chloride on the surface of a polyamide membrane to form a polyester protection layer on the surface of the membrane.

2. Optimization of the Synthesis Condition of the Reverse Osmosis Membrane

The relation between the flux and five factors (the aqueous phase retention time, the concentration of m-phenylenediamine (MPD), the concentration of triethylamine (TEA), the concentration of D(+) camphorsulfonic acid (CSA), and the concentration of trimesoyl chloride) and the relation between the desalinization rate and the five factors were studied by means of an orthogonal method; then, an optimal combination of the flux and the desalinization rate corresponding to the levels of the five factors was figured out; and finally, range analysis was carried out to compare the superiorities of the factors as well as the superiorities of specific levels of the factors to select optimal factors and an optimal combination so as to determine an optimal synthesis condition. Remaining reaction conditions remained unchanged and were as follows: the oil phase retention time was 60 s, the humidity was 60% RH, and the thermal curing temperature was 80° C. The flux and desalinization rate were tested based on the following criterion: 2000 ppm NaCl, 225 psi(15.5 bar), and 77° F.(25° C.). The specific test design is shown in Table 1.

TABLE 1

Table of test factors and levels

| Level | Concentration of TMC (wt %) | Concentration of MPD (wt %) | Concentration of TEA (wt %) | Concentration of CSA (wt %) | Aqueous phase retention time (s) |
|---|---|---|---|---|---|
| 1 | 0.10 | 1.00 | 0.70 | 1.20 | 30 |
| 2 | 0.15 | 1.50 | 1.00 | 1.80 | 60 |
| 3 | 0.20 | 2.00 | 1.30 | 2.40 | 120 |
| 4 | 0.25 | 2.50 | 1.60 | 3.00 | 180 |

TABLE 2

Table of test results

| Serial number | Concentration of TMC (wt %) | Concentration of MPD (wt %) | Concentration of TEA (wt %) | Concentration of CSA (wt %) | Aqueous phase retention time (s) | Mean flux (LMH) | Mean desalinization rate (%) |
|---|---|---|---|---|---|---|---|
| 1 | 1(0.10) | 1(1.00) | 1(0.70) | 1(1.20) | 1(30) | 27.365 | 99.455 |
| 2 | 1(0.10) | 2(1.50) | 2(1.00) | 2(1.80) | 2(60) | 35.72 | 98.465 |
| 3 | 1(0.10) | 3(2.00) | 3(1.30) | 3(2.40) | 3(120) | 49.73 | 99.27 |
| 4 | 1(0.10) | 4(2.50) | 4(1.60) | 4(3.00) | 4(180) | 33.54 | 99.1 |
| 5 | 2(0.15) | 1(1.00) | 2(1.00) | 3(2.40) | 4(180) | 22.51 | 98.605 |
| 6 | 2(0.15) | 2(1.50) | 1(0.70) | 4(3.00) | 3(120) | 16.465 | 98.255 |
| 7 | 2(0.15) | 3(2.00) | 4(1.60) | 1(1.20) | 2(60) | 27.92 | 98.595 |
| 8 | 2(0.15) | 4(2.50) | 3(1.30) | 2(1.80) | 1(30) | 24.70 | 98.775 |
| 9 | 3(0.20) | 1(1.00) | 3(1.30) | 4(3.00) | 2(60) | 15.60 | 98.085 |
| 10 | 3(0.20) | 2(1.50) | 4(1.60) | 3(2.40) | 1(30) | 19.165 | 98.405 |
| 11 | 3(0.20) | 3(2.00) | 1(0.70) | 2(1.80) | 4(180) | 19.755 | 98.835 |
| 12 | 3(0.20) | 4(2.50) | 2(1.00) | 1(1.20) | 3(120) | 22.80 | 99.20 |
| 13 | 4(0.25) | 1(1.00) | 4(1.60) | 2(1.80) | 3(120) | 17.76 | 97.895 |
| 14 | 4(0.25) | 2(1.50) | 3(1.30) | 1(1.20) | 4(180) | 18.715 | 98.68 |
| 15 | 4(0.25) | 3(2.00) | 2(1.00) | 4(3.00) | 1(30) | 14.30 | 98.09 |
| 16 | 4(0.25) | 4(2.50) | 1(0.70) | 3(2.40) | 2(60) | 14.765 | 98.175 |

Range analysis results of the mean flux are shown in Table 3. As for the mean flux, it can be known, in conjunction with the comparison of R values, that factor 1 (the concentration of TMC) in the five factors is the optimal factor, and factor 5 (the aqueous phase retention time) in the five factors is the worst factor. The superiorities of the five factors are ranked as follows: factor 1 (the concentration of TMC)>factor 3 (the concentration of TEA)>factor 2 (the concentration of MIPD)>factor 4 (the concentration of CSA)>factor 5 (the aqueous phase retention time). It can be known, in conjunction with the optimal levels of the factors, that factor 1 (the concentration of TMC) is optimal at the first level (0.10 wt %), factor 2 (the concentration of MPD) is optimal at the third level (2.00 wt %), factor 3 (the concentration of TEA) is optimal at the fourth level (1.30 wt %), factor 4 (the concentration of CSA) is optimal at the third level (2.40 wt %), and factor 5 (the aqueous phase retention time) is optimal at the third level (120 s).

It can be known, according to the above analysis, that the optimal factor for the mean flux is the concentration of TMC. The optimal combination for the mean flux is "the concentration of TMC 0.10 wt %, the concentration of MPD 2.00 wt %, the concentration of TEA 1.30 wt %, the concentration of CSA 2.40 wt %, and the aqueous phase retention time 120 s".

Range analysis results of the mean desalinization rate are shown in Table 4. As for the mean desalinization rate, it can be known, in conjunction with the comparison of R values, that factor 1 (the concentration of TMC) in the five factors is the optimal factor, and factor 2 (the concentration of MPD) in the five factors is the worst factor. The superiorities of the five factors are ranked as follows: factor 1 (the concentration of TMC)>factor 4 (the concentration of CSA)>factor 5 (the aqueous phase retention time)>factor 3 (the concentration of TEA)>factor 2 (the concentration of MPD). It can be known, in conjunction with the optimal levels of the factors, that factor 1 (the concentration of TMC) is optimal at the first level (0.10 wt %), factor 2 (the concentration of MPD) is optimal at the four level (2.50 wt %), factor 3 (the concentration of TEA) is optimal at the third level (1.30 wt %), factor 4 (the concentration of CSA) is optimal at the first level (1.20 wt %), and factor 5 (the aqueous phase retention time) is optimal at the fourth level (180 s).

It can be known, according to the above analysis, that the optimal factor for the mean desalinization rate is the concentration of TMC. The optimal combination for the mean desalinization rate is "the concentration of TMC 0.10 wt %, the concentration of MPD 2.50 wt %, the concentration of TEA 1.30 wt %, the concentration of CSA 1.20 wt %, and the aqueous phase retention time 180 s".

TABLE 3

Table of range analysis of the mean flux

| Item | Level | Factor 1 | Factor 2 | Factor 3 | Factor 4 | Factor 5 |
|---|---|---|---|---|---|---|
| K value | 1 | 146.36 | 83.24 | 78.35 | 96.80 | 85.53 |
|  | 2 | 91.60 | 90.07 | 95.33 | 97.94 | 94.01 |
|  | 3 | 77.32 | 111.71 | 108.75 | 106.17 | 106.76 |
|  | 4 | 65.54 | 95.81 | 98.39 | 79.91 | 94.52 |
| K avg value | 1 | 36.59 | 20.81 | 19.59 | 24.20 | 21.38 |
|  | 2 | 22.90 | 22.52 | 23.83 | 24.48 | 23.50 |
|  | 3 | 19.33 | 27.93 | 27.19 | 26.54 | 26.69 |
|  | 4 | 16.39 | 23.95 | 24.60 | 19.98 | 23.63 |
| Optimal level |  | 1 | 3 | 3 | 3 | 3 |
| R |  | 20.20 | 7.12 | 7.60 | 4.51 | 5.31 |
| Level quantity |  | 4 | 4 | 4 | 4 | 4 |
| Repeats of each level |  | 4.0 | 4.0 | 4.0 | 4.0 | 4.0 |

TABLE 4

Table of range analysis of the mean desalinization rate

| Item | Level | Factor 1 | Factor 2 | Factor 3 | Factor 4 | Factor 5 |
|---|---|---|---|---|---|---|
| K value | 1 | 396.29 | 394.01 | 394.72 | 395.93 | 394.73 |
|  | 2 | 394.23 | 393.81 | 394.36 | 393.97 | 393.32 |
|  | 3 | 394.53 | 394.79 | 394.81 | 394.46 | 394.62 |
|  | 4 | 392.84 | 395.25 | 394.00 | 393.53 | 395.22 |
| K avg value | 1 | 99.07 | 98.50 | 98.68 | 98.98 | 98.68 |
|  | 2 | 98.56 | 98.45 | 98.59 | 98.49 | 98.33 |
|  | 3 | 98.63 | 98.70 | 98.70 | 98.61 | 98.66 |
|  | 4 | 98.21 | 98.81 | 98.50 | 98.38 | 98.81 |
| Optimal level |  | 1 | 4 | 3 | 1 | 4 |
| R |  | 0.86 | 0.36 | 0.20 | 0.60 | 0.48 |
| Level quantity |  | 4 | 4 | 4 | 4 | 4 |
| Repeats r of each level |  | 4.0 | 4.0 | 4.0 | 4.0 | 4.0 |

Based on the above analysis, it can be known that according to the test results of the mean flux and the mean desalinization ratio, the optimal factor for synthesizing the reverse osmosis membrane is the concentration of TMC, and the optimal combination is "the concentration of TMC 0.10 wt %, the concentration of MPD 2.00-2.50 wt %, the concentration of TEA 1.30 wt %, the concentration of CSA 1.20-2.40 wt %, the aqueous phase retention time 120-180 s".

3. Selection of Base Membranes

Four base membranes were selected to prepare reverse osmosis membranes, and the synthesis condition is the optimal combination for the mean flux "the concentration of TMC 0.10 wt %, the concentration of MPD 2.00 wt %, the concentration of TEA 1.30 wt %, the concentration of CSA 2.40 wt %, and the aqueous phase retention time 120 s" for the average flux is used as the synthesis condition. The remaining reaction conditions were still as follows: the oil phase retention time was 60 s, the humidity was 60% RH, and the thermal curing temperature was 80° C. A standard test condition was as follows: 2000 ppm NaCl, 225 psi(15.5 bar), 77° F.(25° C.). Test results obtained at a normal temperature (25° C.) are shown in table 5.

TABLE 5

Performance of reverse osmosis membranes prepared from different base membranes at the normal temperature

| Base membrane No. | Flux F/L · $m^{-2}$ · $h^{-1}$ | Desalinization rate R/% |
|---|---|---|
| 1 | 39.62 | 99.24 |
| 2 | 48.045 | 97.04 |
| 3 | 37.61 | 95.43 |
| 4 | 18.805 | 99.16 |

According to the test results of the performance of reverse osmosis membranes prepared from different base membranes, the reverse osmosis membranes prepared from base membranes 2 and 3 have a low desalinization rate, and the reverse osmosis membrane prepared from base membrane 4 has a low flux, so base membrane 1 is used to prepare the reverse osmosis membrane by the "preparation method for a reverse osmosis membrane resistant to a high-temperature water environment". The prepared reverse osmosis membrane was compared with a commercial reverse osmosis membrane. In a test, the operating temperature gradually rises from 25° C. to 80° C., and the test results are shown in Table 6.

By testing, the flux of the three reverse osmosis membranes increases gradually with the rise of the temperature. When the reverse osmosis membrane prepared by secondary interfacial polymerization operates at the temperature of 25° C.-80° C., the desalinization rate is greater than 99.1500. When the reverse osmosis membrane prepared by primary interfacial polymerization operates at a temperature below 50° C., the desalinization rate is stabilized over 99.1%; the desalinization rate starts to decrease when the operating temperature is over 50° C., and finally reaches 97.42% at the temperature of 80° C. The desalinization rate of the commercial reverse osmosis membrane increases gradually with the rise of the operating temperature, and the desalinization rate of the commercial reverse osmosis membrane at the operating temperature of 80° C. is 98.22%.

It thus can be seen that the reverse osmosis membrane prepared by the preparation method provided by the invention has high high-temperature resistance. Then, a high-temperature resistance test was cyclically performed on the reverse osmosis membrane. After a first high-temperature resistance test, the membrane was placed in a test device and cooled overnight, and then a second high-temperature resistance test was performed again.

TABLE 7

Cyclic test of the high-temperature resistance of the reverse osmosis membrane

| Operating temperature T/° C. | First high-temperature resistance test | | Second high-temperature resistance test | |
|---|---|---|---|---|
| | Flux F/L · $m^{-2}$ · $h^{-1}$ | Desalinization rate R/% | Flux F/L · $m^{-2}$ · $h^{-1}$ | Desalinization rate R/% |
| 25 | 39.98 | 99.54 | 30.42 | 99.48 |
| 30 | 50.7 | 99.56 | 33.15 | 99.44 |
| 40 | 69.26 | 99.51 | 46.8 | 99.38 |
| 50 | 76.82 | 99.48 | 62.39 | 99.31 |
| 60 | 94.36 | 99.45 | 81.89 | 99.35 |
| 70 | 107.63 | 99.36 | 103.99 | 99.34 |
| 80 | 116.99 | 99.18 | 114.39 | 99.17 |

After the high-temperature test, the flux is decreased in the second high-temperature resistance test because the membrane is compacted in the first high-temperature resistance test, and the desalinization rate of at the operating temperature of 25° C.-80° C. in the two tests are both greater than 99.15%, indicating that the reverse osmosis membrane

TABLE 6

High-temperature resistance of different reverse osmosis membranes

| Operating temperature T/° C. | Reverse osmosis membrane prepared by secondary interfacial polymerization | | Reverse osmosis membrane prepared by primary interfacial polymerization | | Commercial reverse osmosis membrane | |
|---|---|---|---|---|---|---|
| | Flux F/L · $m^{-2}$ · $h^{-1}$ | Desalinization rate R/% | Flux F/L · $m^{-2}$ · $h^{-1}$ | Desalinization rate R/% | Flux F/L · $m^{-2}$ · $h^{-1}$ | Desalinization rate R/% |
| 25 | 39.98 | 99.54 | 39.62 | 99.24 | 67.5 | 99.27 |
| 30 | 50.7 | 99.56 | 45.24 | 99.265 | 76.26 | 99.125 |
| 40 | 69.26 | 99.51 | 57.19 | 99.31 | 94.46 | 98.87 |
| 50 | 76.82 | 99.48 | 69.41 | 99.13 | 119.85 | 98.67 |
| 60 | 94.36 | 99.45 | 84.62 | 98.985 | 145.24 | 98.47 |
| 70 | 107.63 | 99.36 | 103.34 | 97.82 | 170.2 | 98.49 |
| 80 | 116.99 | 99.18 | 113.09 | 97.42 | 203.82 | 98.22 |

What is claimed is:

1. A preparation method for a reverse osmosis membrane resistant to a high-temperature water environment, comprising the following steps:
    (1) first, synthesis of an α-cyclodextrin@polyethylene glycol supramolecular inclusion complex (α-CD@PEG) by a saturated aqueous solution coprecipitation method: first, dissolving a specific quantity of polyethylene glycol in ultrapure water to prepare a polyethylene glycol saturated aqueous solution; then, adding α-cyclodextrin powder to the polyethylene glycol saturated aqueous solution, performing constant-temperature stirring and standing, cooling to an ambient temperature, filtering out precipitates, and drying to obtain α-cyclodextrin@polyethylene glycol powder;
    (2) preparation of an aqueous phase solution: dissolving a specific quantity of m-phenylenediamine, D(+) camphorsulfonic acid and triethylamine in a specific quantity of ultrapure water to prepare the aqueous phase solution;
    (3) preparation of an oil phase solution: dissolving a specific quantity of trimesoyl chloride in a specific quantity of n-hexane to prepare the oil phase solution;
    (4) preparation of a secondary aqueous phase solution: dissolving a specific quantity of the α-cyclodextrin@polyethylene glycol powder and triethylamine in a specific quantity of ultrapure water to prepare the secondary aqueous phase solution;
    (5) interfacial polymerization: taking a base membrane from water, blowing water away from a surface of the base membrane with nitrogen, and pouring the aqueous phase solution onto the surface of the base membrane for 30 s-180 s; removing the superfluous aqueous phase solution, and then blow-drying the surface of the base membrane with nitrogen; pouring the oil phase a solution onto the surface of the base membrane for a reaction, and then removing the superfluous oil phase solution to yield a prepared membrane; thermocuring the prepared membrane in an oven to form an ultrathin polyamide separation layer on the prepared membrane; and
    (6) secondary interfacial polymerization: pouring the secondary aqueous phase solution onto the ultrathin polyamide separation layer of the prepared membrane for a reaction, and then removing the superfluous solution to form an α-CD@PEG polyester protection layer on the ultrathin polyamide separation layer yielding a prepared reverse osmosis membrane; washing a surface of the prepared reverse osmosis membrane with ultrapure water.

2. The preparation method for a reverse osmosis membrane resistant to a high-temperature water environment according to claim 1, wherein in the Step (1), a molar ratio of the α-cyclodextrin to the polyethylene glycol is one of 4:1, 5:1, 6:1, 7:1 and 8:1.

3. The preparation method for a reverse osmosis membrane resistant to a high-temperature water environment according to claim 1, wherein in the Step (1), a temperature of the constant-temperature stirring is 65° C., a time of the constant-temperature stirring is 1 hr, and a time of the standing is 12 hrs.

4. The preparation method for a reverse osmosis membrane resistant to a high-temperature water environment according to claim 1, wherein in the Step (1), a temperature of the drying is 70° C., and a time of the drying is 12 hrs.

5. The preparation method for a reverse osmosis membrane resistant to a high-temperature water environment according to claim 1, wherein in the Step (2), a concentration of the m-phenylenediamine is 2-2.5 wt %, a concentration of the D(+) camphorsulfonic acid is 1.2-2.4 wt %, and a concentration of the triethylamine is 1.3 wt %; in the Step (3), a concentration of the trimesoyl chloride is 0.1 wt %.

6. The preparation method for a reverse osmosis membrane resistant to a high-temperature water environment according to claim 1, wherein in the Step (5), the aqueous phase solution is retained on the surface of the base membrane for 120-180 s.

7. The preparation method for a reverse osmosis membrane resistant to a high-temperature water environment according to claim 1, wherein in the Step (5), the prepared membrane is thermocured in the oven at 80° C. for 5 min.

8. The preparation method for a reverse osmosis membrane resistant to a high-temperature water environment according to claim 1, wherein in the Step (6), the storing is performed in ultrapure water at 4° C.

* * * * *